United States Patent
Miyatake et al.

(10) Patent No.: US 12,525,643 B2
(45) Date of Patent: *Jan. 13, 2026

(54) SOLID ELECTROLYTE MATERIAL AND BATTERY USING SAME

(71) Applicant: Panasonic Intellectual Property Management Co., Ltd., Osaka (JP)

(72) Inventors: Kazufumi Miyatake, Osaka (JP); Yusuke Nishio, Osaka (JP); Takashi Kubo, Hyogo (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 657 days.

This patent is subject to a terminal disclaimer.

(21) Appl. No.: 17/931,562

(22) Filed: Sep. 13, 2022

(65) Prior Publication Data

US 2023/0019493 A1 Jan. 19, 2023

Related U.S. Application Data

(63) Continuation of application No. PCT/JP2020/049234, filed on Dec. 28, 2020.

(30) Foreign Application Priority Data

Mar. 31, 2020 (JP) .................................. 2020-064818

(51) Int. Cl.
*H01M 10/0525* (2010.01)
*H01M 10/0562* (2010.01)

(52) U.S. Cl.
CPC .................. *H01M 10/0562* (2013.01); *H01M 10/0525* (2013.01); *H01M 2300/0068* (2013.01)

(58) Field of Classification Search
CPC ................................................. H01M 10/0562
See application file for complete search history.

(56) References Cited

U.S. PATENT DOCUMENTS

| 2019/0088995 | A1 | 3/2019 | Asano et al. | |
| 2020/0328460 | A1* | 10/2020 | Asano | .................... C01G 9/006 |
| 2022/0246983 | A1* | 8/2022 | Suzuki | .................... H01B 1/06 |
| 2023/0006247 | A1* | 1/2023 | Miyatake | .......... H01M 10/0525 |
| 2023/0008629 | A1* | 1/2023 | Miyatake | ................ H01M 4/62 |

FOREIGN PATENT DOCUMENTS

| CN | 108511795 A | 9/2018 |
| JP | 2011-129312 | 6/2011 |
| WO | 2011/073798 | 6/2011 |
| WO | 2018/025582 | 2/2018 |
| WO | 2019/135343 | 7/2019 |

OTHER PUBLICATIONS

English Translation of Chinese Search Report dated Jun. 28, 2024, for the related Chinese Patent Application No. 202080098563.2.
International Search Report of PCT application No. PCT/JP2020/049234 dated Mar. 23, 2021.

* cited by examiner

*Primary Examiner* — Nicholas A Smith
*Assistant Examiner* — Zackary Richard Cochenour
(74) *Attorney, Agent, or Firm* — GREENBLUM & BERNSTEIN, P.L.C.

(57) ABSTRACT

The solid electrolyte material of the present disclosure includes Li, Ca, Y, Sm, X, and O, wherein X is at least one selected from the group consisting of F, Cl, Br, and I.

6 Claims, 4 Drawing Sheets

SOLID ELECTROLYTE MATERIAL AND BATTERY USING SAME

BACKGROUND

1. Technical Field

The present disclosure relates to a solid electrolyte material and a battery using it.

2. Description of the Related Art

Japanese Unexamined Patent Application Publication No. 2011-129312 discloses an all solid state battery using a sulfide solid electrolyte. International Publication No. WO 2018/025582 discloses a solid electrolyte material represented by $Li_{6-3z}Y_zX_6$ (0<z<2 is satisfied, and X is Cl or Br).

SUMMARY

One non-limiting and exemplary embodiment provides a solid electrolyte material having a high lithium ion conductivity.

In one general aspect, the techniques disclosed here feature a solid electrolyte material including Li, Ca, Y, Sm, X, and O, where X is at least one selected from the group consisting of F, Cl, Br, and I.

The present disclosure provides a solid electrolyte material having a high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
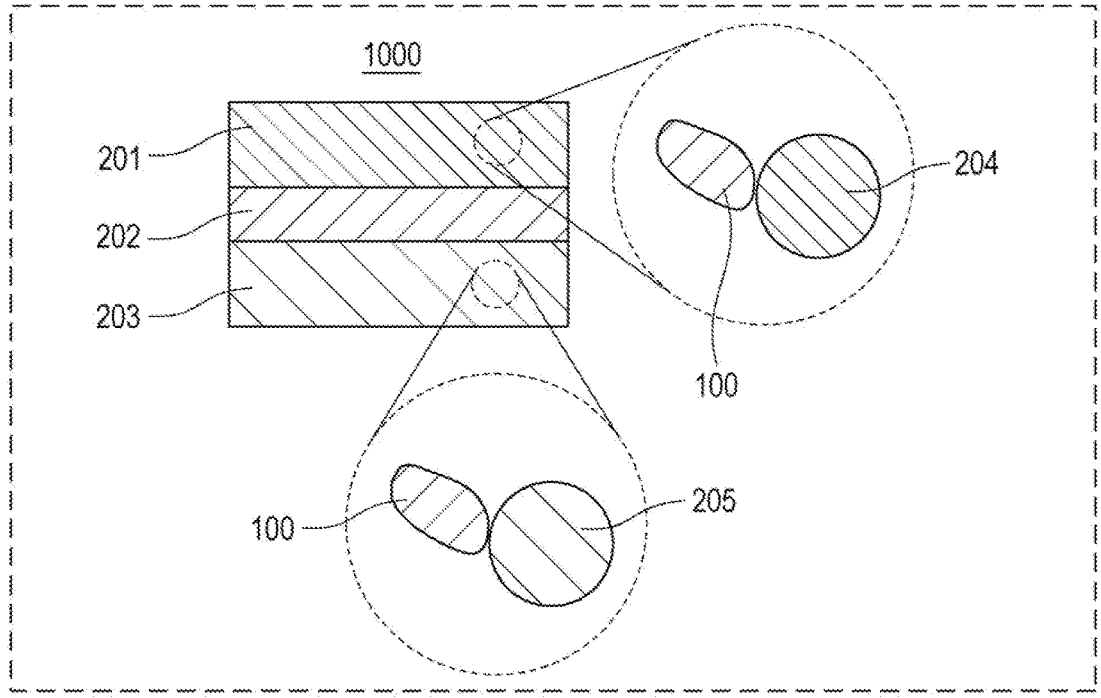
FIG. 1 shows a cross-sectional view of a battery according to a second embodiment.

Embodiments of the present disclosure will now be described with reference to the drawings.

First Embodiment

The solid electrolyte material according to a first embodiment includes Li, Ca, Y, Sm, X, and O. Here, X is at least one selected from the group consisting of F, Cl, Br, and I.

The solid electrolyte material according to the first embodiment has a high lithium ion conductivity. Here, the high lithium ion conductivity is, for example, $1\times10^{-5}$ S/cm or more. That is, the solid electrolyte material according to the first embodiment can have, for example, an ion conductivity of $1\times10^{-5}$ S/cm or more.

The solid electrolyte material according to the first embodiment can be used for obtaining an all solid state battery having excellent charge and discharge characteristics. The all solid state battery may be a primary battery or a secondary battery.

The solid electrolyte material according to the first embodiment desirably does not contain sulfur. A solid electrolyte material not containing sulfur does not generate hydrogen sulfide, even if it is exposed to the atmosphere, and is therefore excellent in safety. The sulfide solid electrolyte disclosed in Japanese Unexamined Patent Application Publication No. 2011-129312 may generate hydrogen sulfide when it is exposed to the atmosphere.

The solid electrolyte material according to the first embodiment may consist essentially of Li, Ca, Y, Sm, X, and O. The phrase "the solid electrolyte material according to the first embodiment consists essentially of Li, Ca, Y, Sm, X, and O" means that the molar proportion (i.e., molar fraction) of the sum of the amounts of Li, Ca, Y, Sm, X, and O to the sum of the amounts of all elements constituting the solid electrolyte material in the solid electrolyte material according to the first embodiment is 90% or more. As an example, the molar proportion may be 95% or more. The solid electrolyte material according to the first embodiment may consist of Li, Ca, Y, Sm, X, and O only.

In order to enhance the ion conductivity of the solid electrolyte material, X may be Cl and Br.

In order to enhance the ion conductivity of the solid electrolyte material, the solid electrolyte material according to the first embodiment may further include at least one selected from the group consisting of Gd, Sr, Ba, Al, Sc, Ga, Bi, La, Zr, Hf, Ta, and Nb.

The transition metal included in the solid electrolyte material according to the present embodiment may be only Y and Sm excluding elements included as inevitable impurities.

The X-ray diffraction pattern of the solid electrolyte material according to the first embodiment can be obtained using Cu-Kα rays. In the obtained X-ray diffraction pattern, peaks may be present in diffraction angle 2θ ranges of 14.9° or more and 16.0° or less, 16.2° or more and 17.4° or less, 22.3° or more and 23.5° or less, 28.1° or more and 29.2° or less, 30.0° or more and 31.2° or less, 32.1° or more and 33.3° or less, 39.2° or more and 40.3° or less, 47.0° or more and 48.1° or less, and 51.5° or more and 52.6° or less. Such a solid electrolyte material has a high ion conductivity.

In order to enhance the ion conductivity of the solid electrolyte material, the following four mathematical expressions may be satisfied:

$2.6 \leq x \leq 3.4;$ $0.09 \leq y \leq 0.11;$ $1.2 \leq z \leq 2.1;$ and $2.7 \leq w \leq 4.4,$ wherein, x represents a molar ratio of Li to the sum of Y and Sm;
y represents a molar ratio of Ca to the sum of Y and Sm;
z represents a molar ratio of Br to the sum of Y and Sm; and
w represents a molar ratio of Cl to the sum of Y and Sm.

In order to further enhance the ion conductivity of the solid electrolyte material, the following four mathematical expressions may be satisfied:

$2.9 \leq x \leq 3.1$;

$0.09 \leq y \leq 0.11$;

$1.3 \leq z \leq 1.9$; and $3.0 \leq w \leq 4.0$.

In order to enhance the ion conductivity of the solid electrolyte material, the molar ratio of O to the sum of Y and Sm may be greater than 0 and 0.36 or less.

In order to enhance the ion conductivity of the solid electrolyte material, in the solid electrolyte material according to the first embodiment, the molar ratio of O to the sum of Y and Sm may be greater than 0 and 0.08 or less. The molar ratio of O to the sum of Y and Sm may be greater than 0 and 0.04 or less. The molar ratio of O to the sum of Y and Sm may be greater than 0 and 0.01 or less.

The shape of the solid electrolyte material according to the first embodiment is not limited. Examples of the shape are needle, spherical, and oval spherical shapes. The solid electrolyte material according to the first embodiment may be a particle. The solid electrolyte material according to the first embodiment may be formed so as to have a pellet or planar shape.

When the shape of the solid electrolyte material according to the first embodiment is a particulate shape (e.g., spherical), the solid electrolyte material according to the first embodiment may have a median diameter of 0.1 μm or more and 100 μm or less. The median diameter means the particle diameter at which the accumulated volume in a volume-based particle size distribution is equal to 50%. The volume-based particle size distribution can be measured with, for example, a laser diffraction measurement apparatus or an image analyzer.

In order to enhance the ion conductivity of the solid electrolyte material according to the first embodiment and to well disperse the solid electrolyte material according to the first embodiment and an active material, the median diameter may be 0.5 μm or more and 10 μm or less.

Method for Manufacturing Solid Electrolyte Material

The solid electrolyte material according to the first embodiment can be manufactured by the following method.

First, raw material powders are provided so as to give a target composition and are mixed.

When a solid electrolyte material consisting of Li, Ca, Y, Sm, Br, Cl, and O is produced, a LiCl raw material powder, a LiBr raw material powder, a $YCl_3$ raw material powder, a $SmCl_3$ raw material powder, and $CaBr_2$ are mixed. The resulting powder mixture is heat-treated in an inert gas atmosphere with adjusted oxygen concentration and moisture concentration (for example, an argon atmosphere having a dew point of −60° C. or less). The heat treatment temperature may be, for example, within a range of 200° C. or more and 650° C. or less. The resulting heat treatment product is left to stand in an atmosphere having a relatively high dew point (for example, a dry atmosphere having a dew point of −30° C.).

Subsequently, heat treatment is performed, for example, in an inert gas atmosphere with adjusted oxygen concentration and moisture concentration (for example, an argon atmosphere having a dew point of −60° C. or less) at a temperature of the melting point or more (for example, 500° C.). O can be present in the entire solid electrolyte material by heat treatment at a temperature of the melting point or more. The raw material powders may be mixed at a molar ratio adjusted in advance so as to offset a composition change that may occur in the synthesis process. The oxygen amount in a solid electrolyte material is determined by selecting the raw material powders, the oxygen concentration in the atmosphere, the moisture concentration in the atmosphere, and the reaction time. Thus, the solid electrolyte material according to the first embodiment is obtained.

The heat treatment product obtained by the first heat treatment may be used as the solid electrolyte material according to the first embodiment.

The raw material powders to be mixed may be an oxide and a halide. For example, as the raw material powders, $Y_2O_3$, $Sm_2O_3$, $NH_4Cl$, $NH_4Br$, LiCl, LiBr, $CaCl_2$, and $CaBr_2$ may be used.

It is inferred that the oxygen constituting the solid electrolyte material according to the first embodiment is incorporated from the above-mentioned atmosphere having a relatively high dew point.

Second Embodiment

A second embodiment will now be described. The matters described in the first embodiment may be appropriately omitted.

The battery according to the second embodiment includes a positive electrode, a negative electrode, and an electrolyte layer. The electrolyte layer is disposed between the positive electrode and the negative electrode. At least one selected from the group consisting of the positive electrode, the electrolyte layer, and the negative electrode contains the solid electrolyte material according to the first embodiment.

The battery according to the second embodiment contains the solid electrolyte material according to the first embodiment and therefore has excellent charge and discharge characteristics.

FIG. 1 shows a cross-sectional view of a battery 1000 according to the second embodiment.

The battery 1000 includes a positive electrode 201, an electrolyte layer 202, and a negative electrode 203. The electrolyte layer 202 is disposed between the positive electrode 201 and the negative electrode 203.

The positive electrode 201 contains a positive electrode active material particle 204 and a solid electrolyte particle 100.

The electrolyte layer 202 contains an electrolyte material (for example, a solid electrolyte material).

The negative electrode 203 contains a negative electrode active material particle 205 and a solid electrolyte particle 100.

The solid electrolyte particle 100 is a particle containing the solid electrolyte material according to the first embodiment as a main component. Here, the particle containing the solid electrolyte material according to the first embodiment as a main component means a particle in which the most abundant component in terms of mass proportion is the solid electrolyte material according to the first embodiment. The solid electrolyte particle 100 may be a particle consisting of the solid electrolyte material according to the first embodiment.

The positive electrode 201 contains a material that can occlude and release metal ions (for example, lithium ions). The material is, for example, a positive electrode active material (for example, the positive electrode active material particle 204).

Examples of the positive electrode active material are a lithium-containing transition metal oxide, a transition metal fluoride, a polyanionic material, a fluorinated polyanionic material, a transition metal sulfide, a transition metal oxyfluoride, a transition metal oxysulfide, and a transition metal oxynitride. Examples of the lithium-containing transition metal oxide are $LiNi_{1-d-f}Co_dAl_fO_2$ (here, 0<d, 0<f, and 0<(d+f)<1) and $LiCoO_2$.

In order to well disperse the positive electrode active material particle 204 and the solid electrolyte particle 100 in the positive electrode 201, the positive electrode active material particle 204 may have a median diameter of 0.1 μm or more. This good dispersion improves the charge and discharge characteristics of the battery 1000. In order to rapidly diffuse lithium in the positive electrode active material particle 204, the positive electrode active material particle 204 may have a median diameter of 100 μm or less. The battery 1000 can be operated at a high output due to the rapid diffusion of lithium. As described above, the positive electrode active material particle 204 may have a median diameter of 0.1 μm or more and 100 μm or less.

In order to well disperse the positive electrode active material particle 204 and the solid electrolyte particle 100 in the positive electrode 201, the positive electrode active material particle 204 may have a median diameter larger than that of the solid electrolyte particle 100.

In order to increase the energy density and output of the battery 1000, in the positive electrode 201, the ratio of the volume of the positive electrode active material particle 204 to the sum of the volumes of the positive electrode active material particle 204 and the solid electrolyte particle 100 may be 0.30 or more and 0.95 or less.

In order to increase the energy density and output of the battery 1000, the positive electrode 201 may have a thickness of 10 μm or more and 500 μm or less.

The electrolyte layer 202 contains an electrolyte material. The electrolyte material may be the solid electrolyte material according to the first embodiment. The electrolyte layer 202 may be a solid electrolyte layer.

The electrolyte layer 202 may be constituted of only the solid electrolyte material according to the first embodiment. Alternatively, the electrolyte layer 202 may be constituted of only a solid electrolyte material that is different from the solid electrolyte material according to the first embodiment.

Examples of the solid electrolyte material that is different from the solid electrolyte material according to the first embodiment are $Li_2MgX'_4$, $Li_2FeX'_4$, $Li(Al,Ga,In)X'_4$, $Li_3(Al,Ga,In)X'_6$, and LiI. Here, X' is at least one selected from the group consisting of F, Cl, Br, and I.

In the present disclosure, "(A,B,C)" means "at least one selected from the group consisting of A, B, and C".

Hereinafter, the solid electrolyte material according to the first embodiment is called a first solid electrolyte material. The solid electrolyte material that is different from the solid electrolyte material according to the first embodiment is called a second solid electrolyte material.

The electrolyte layer 202 may contain not only the first solid electrolyte material but also the second solid electrolyte material. The first solid electrolyte material and the second solid electrolyte material may be uniformly dispersed. A layer made of the first solid electrolyte material and a layer made of the second solid electrolyte material may be stacked along the stacking direction of the battery 1000.

In order to prevent short circuit between the positive electrode 201 and the negative electrode 203 and to increase the output of the battery, the electrolyte layer 202 may have a thickness of 1 μm or more and 100 μm or less.

The negative electrode 203 contains a material that can occlude and release metal ions (for example, lithium ions). The material is, for example, a negative electrode active material (for example, the negative electrode active material particle 205).

Examples of the negative electrode active material are a metal material, a carbon material, an oxide, a nitride, a tin compound, and a silicon compound. The metal material may be a single metal or an alloy. Examples of the metal material are a lithium metal and a lithium alloy. Examples of the carbon material are natural graphite, coke, graphitizing carbon, carbon fibers, spherical carbon, artificial graphite, and amorphous carbon. From the viewpoint of capacity density, suitable examples of the negative electrode active material are silicon (i.e., Si), tin (i.e., Sn), a silicon compound, and a tin compound.

In order to well disperse the negative electrode active material particle 205 and the solid electrolyte particle 100 in the negative electrode 203, the negative electrode active material particle 205 may have a median diameter of 0.1 μm or more. The good dispersion improves the charge and discharge characteristics of the battery. In order to rapidly disperse lithium in the negative electrode active material particle 205, the negative electrode active material particle 205 may have a median diameter of 100 μm or less. The battery can be operated at a high output due to the rapid diffusion of lithium. As described above, the negative electrode active material particle 205 may have a median diameter of 0.1 μm or more and 100 μm or less.

In order to well disperse the negative electrode active material particle 205 and the solid electrolyte particle 100 in the negative electrode 203, the negative electrode active material particle 205 may have a median diameter larger than that of the solid electrolyte particle 100.

In order to increase the energy density and output of the battery 1000, in the negative electrode 203, the ratio of the volume of the negative electrode active material particle 205 to the sum of the volumes of the negative electrode active material particle 205 and the solid electrolyte particle 100 may be 0.30 or more and 0.95 or less.

In order to increase the energy density and output of the battery 1000, the negative electrode 203 may have a thickness of 10 μm or more and 500 μm or less.

In order to enhance the ion conductivity, chemical stability, and electrochemical stability, at least one selected from the group consisting of the positive electrode 201, the electrolyte layer 202, and the negative electrode 203 may contain the second solid electrolyte material.

As described above, the second solid electrolyte material may be a halide solid electrolyte. Examples of the halide solid electrolyte are $Li_2MgX'_4$, $Li_2FeX'_4$, $Li(Al,Ga,In)X'_4$, $Li_3(Al,Ga,In)X'_6$, and LiI. Here, X' is at least one selected from the group consisting of F, Cl, Br, and I.

The second solid electrolyte material may be a sulfide solid electrolyte.

Examples of the sulfide solid electrolyte are $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

The second solid electrolyte material may be an oxide solid electrolyte.

Examples of the oxide solid electrolyte are:
(i) an NASICON-type solid electrolyte, such as $LiTi_2(PO_4)_3$ or its element substitute;
(ii) a perovskite-type solid electrolyte, such as (LaLi)$TiO_3$;
(iii) an LISICON-type solid electrolyte, such as $Li_{14}ZnGe_4O_{16}$, $Li_4SiO_4$, $LiGeO_4$, or its element substitute;

(iv) a garnet-type solid electrolyte, such as $Li_7La_3Zr_2O_{12}$ or its element substitute; and (v) $Li_3PO_4$ or its N-substitute.

The second solid electrolyte material may be an organic polymer solid electrolyte.

Examples of the organic polymer solid electrolyte are a polymer compound and a compound of a lithium salt. The polymer compound may have an ethylene oxide structure. A polymer compound having an ethylene oxide structure can contain a large amount of a lithium salt and can therefore further enhance the ion conductivity.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these salts may be used alone. Alternatively, a mixture of two or more lithium salts selected from these salts may be used.

At least one selected from the group consisting of the positive electrode 201, the electrolyte layer 202, and the negative electrode 203 may contain a nonaqueous electrolyte liquid, a gel electrolyte, or an ionic liquid for the purpose of facilitating the transfer of lithium ions and improving the output characteristics of the battery 1000.

The nonaqueous electrolyte liquid contains a nonaqueous solvent and a lithium salt dissolved in the nonaqueous solvent.

Examples of the nonaqueous solvent are a cyclic carbonate ester solvent, a chain carbonate ester solvent, a cyclic ether solvent, a chain ether solvent, a cyclic ester solvent, a chain ester solvent, and a fluorine solvent. Examples of the cyclic carbonate ester solvent are ethylene carbonate, propylene carbonate, and butylene carbonate. Examples of the chain carbonate ester solvent are dimethyl carbonate, ethyl methyl carbonate, and diethyl carbonate. Examples of the cyclic ether solvent are tetrahydrofuran, 1,4-dioxane, and 1,3-dioxolane. Examples of the chain ether solvent are 1,2-dimethoxyethane and 1,2-diethoxyethane. An example of the cyclic ester solvent is γ-butyrolactone. An example of the chain ester solvent is methyl acetate. Examples of the fluorine solvent are fluoroethylene carbonate, methyl fluoropropionate, fluorobenzene, fluoroethyl methyl carbonate, and fluorodimethylene carbonate. One nonaqueous solvent selected from these solvents may be used alone. Alternatively, a mixture of two or more nonaqueous solvents selected from these solvents may be used.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these salts may be used alone. Alternatively, a mixture of two or more lithium salts selected from these salts may be used.

The concentration of the lithium salt is, for example, within a range of 0.5 mol/L or more and 2 mol/L or less.

As the gel electrolyte, a polymer material impregnated with a nonaqueous electrolyte liquid can be used. Examples of the polymer material are polyethylene oxide, polyacrylonitrile, polyvinylidene fluoride, polymethyl methacrylate, and a polymer having an ethylene oxide bond.

Examples of the cation included in the ionic liquid are:
(i) an aliphatic chain quaternary salt, such as tetraalkylammonium and tetraalkylphosphonium;
(ii) an alicyclic ammonium, such as pyrrolidiniums, morpholiniums, imidazoliniums, tetrahydropyrimidiniums, piperaziniums, and piperidiniums; and
(iii) a nitrogen-containing heterocyclic aromatic cation, such as pyridiniums and imidazoliums.

Examples of the anion included in the ionic liquid are $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$.

The ionic liquid may contain a lithium salt.

At least one selected from the group consisting of the positive electrode 201, the electrolyte layer 202, and the negative electrode 203 may contain a binder for the purpose of improving the adhesion between individual particles.

Examples of the binder are polyvinylidene fluoride, polytetrafluoroethylene, polyethylene, polypropylene, an aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene butadiene rubber, and carboxymethyl cellulose. A copolymer can also be used as the binder. Examples of such the binder are copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from these materials may be used as the binder.

At least one selected from the positive electrode 201 and the negative electrode 203 may contain a conductive assistant for the purpose of enhancing the electron conductivity.

Examples of the conductive assistant are:
(i) graphites, such as natural graphite and artificial graphite;
(ii) carbon blacks, such as acetylene black and Ketjen black;
(iii) conductive fibers, such as carbon fibers and metal fibers;
(iv) carbon fluoride;
(v) metal powders, such as aluminum;
(vi) conductive whiskers, such as zinc oxide and potassium titanate;
(vii) a conductive metal oxide, such as titanium oxide; and
(viii) a conductive polymer compound, such as polyaniline, polypyrrole, and polythiophene. In order to reduce the cost, the conductive assistant of the above (i) or (ii) may be used.

Examples of the shape of the battery according to the second embodiment are coin type, cylindrical type, square type, sheet type, button type, flat type, and stack type.

The battery according to the second embodiment may be manufactured by, for example, providing a material for forming a positive electrode, a material for forming an electrolyte layer, and a material for forming a negative electrode and producing a stack of a positive electrode, an electrolyte layer, and a negative electrode disposed in this order by a known method.

EXAMPLES

The present disclosure will now be described in more detail with reference to Examples.

Example 1

Production of Solid Electrolyte Material

LiCl, LiBr, $YCl_3$, $SmCl_3$, and $CaBr_2$ were provided as raw material powders such that the $LiCl:LiBr:YCl_3:SmCl_3:CaBr_2$ molar ratio was about 1:1.8:0.8:0.2:0.1 in an argon atmosphere having a dew point of −60° C. or less and an oxygen concentration of 0.0001 vol % or less (hereinafter, referred to as "dry argon atmosphere"). These materials were pulverized and mixed in a mortar. The resulting mixture was heat-treated in an alumina crucible at 500° C. for 1 hour and was then pulverized in a mortar. Thus, a solid electrolyte material of Example 1 was obtained.

Composition Analysis of Solid Electrolyte Material

The contents of Li, Ca, Sm, and Y per unit weight of the solid electrolyte material of Example 1 were measured with a high-frequency inductively coupled plasma emission spectrometer (manufactured by Thermo Fisher Scientific, Inc., iCAP7400) by high-frequency inductively coupled plasma emission spectrometry. The contents of Br and Cl in the solid electrolyte material of Example 1 were measured with an ion chromatography apparatus (manufactured by Dionex, ICS-2000) by an ion chromatography method. The Li:Ca:Y:Sm:Br:Cl molar ratio was calculated based on the contents of Li, Ca, Y, Sm, Br, and Cl obtained from these measurement results. As a result, the solid electrolyte material of Example 1 had a Li:Ca:Y:Sm:Br:Cl molar ratio of 3.07:0.10:0.80:0.20:1.80:3.75.

The ratio of the mass of O to the mass of the entire solid electrolyte material of Example 1 was measured with an oxygen nitrogen hydrogen analyzer (manufactured by HORIBA, Ltd., EMGA-930) by a nondispersive infrared absorption method. As a result, the mass proportion of O was 0.03%. Based on this, the (Y+Sm):O molar ratio was calculated. As a result, the solid electrolyte material of Example 1 had a (Y+Sm):O molar ratio of 1.00:0.01.

In the composition analysis, an element of which the molar fraction relative to the sum of Y and Sm was less than 0.01% was recognized as an impurity.

X-Ray Diffraction

The X-ray diffraction pattern of the solid electrolyte material of Example 1 was measured with an X-ray diffractometer (manufactured by RIGAKU Corporation, MiniFlex 600) in a dry environment having a dew point of −45° C. or less. As the X-ray source, Cu-Kα rays (wavelength: 1.5405 angstrom and 1.5444 angstrom) were used.

Figure 2:
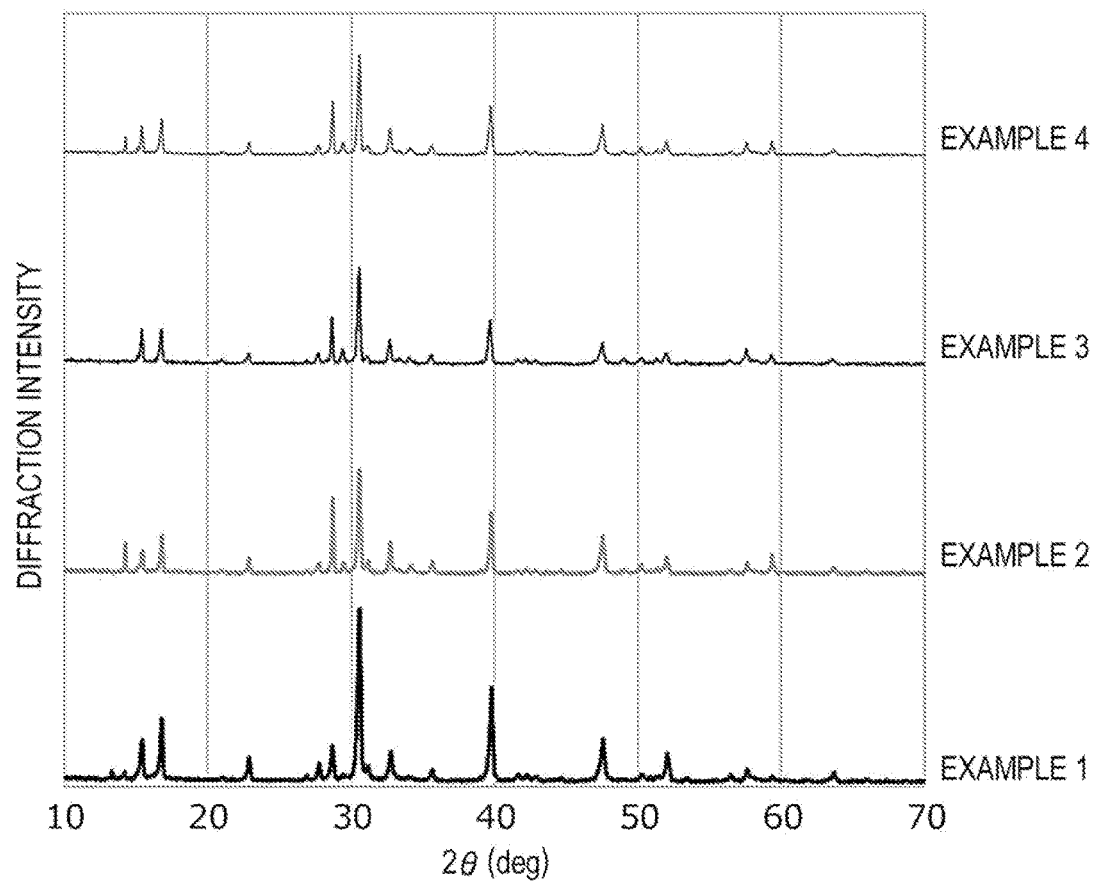
FIG. 2 is a graph showing X-ray diffraction patterns of solid electrolyte materials of Examples 1 to 4.

As the results of the X-ray diffraction measurement, there were peaks at 15.43°, 16.80°, 22.90°, 28.67°, 30.59°, 32.76°, 39.80°, 47.55°, and 52.05°. FIG. 2 is a graph showing an X-ray diffraction pattern of the solid electrolyte material of Example 1.

Evaluation of Ion Conductivity

Figure 3:
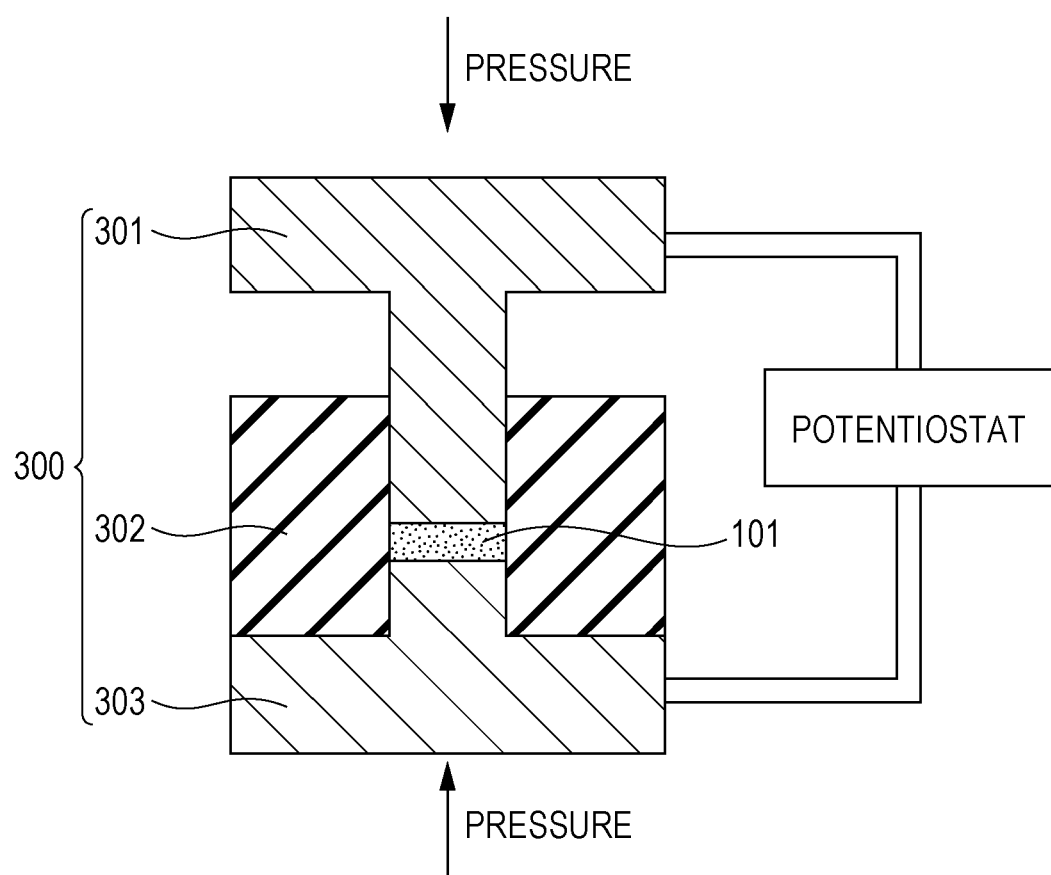
FIG. 3 is a schematic view of a compression molding die used for evaluation of the ion conductivity of a solid electrolyte material.

FIG. 3 is a schematic view of a compression molding die 300 used for evaluation of the ion conductivity of a solid electrolyte material. The compression molding die 300 included a punch upper part 301, a frame mold 302, and a punch lower part 303. The frame mold 302 was made of insulating polycarbonate. The punch upper part 301 and the punch lower part 303 were both made of electron-conductive stainless steel.

The ion conductivity of the solid electrolyte material of Example 1 was measured using the compression molding die 300 shown in FIG. 3 by the following method.

A powder of the solid electrolyte material of Example 1 was loaded in the compression molding die 300 in the dry argon atmosphere. A pressure of 400 MPa was applied to the solid electrolyte material of Example 1 (i.e., powder 101 of the solid electrolyte material in FIG. 3) inside the compression molding die 300 using the punch upper part 301 and the punch lower part 303.

While applying the pressure, the punch upper part 301 and the punch lower part 303 were connected to a potentiostat (manufactured by Princeton Applied Research, VersaS-TAT4). The punch upper part 301 was connected to the working electrode and the potential measurement terminal. The punch lower part 303 was connected to the counter electrode and the reference electrode. The impedance of the solid electrolyte material of Example 1 was measured by an electrochemical impedance measurement method at room temperature.

Figure 4:
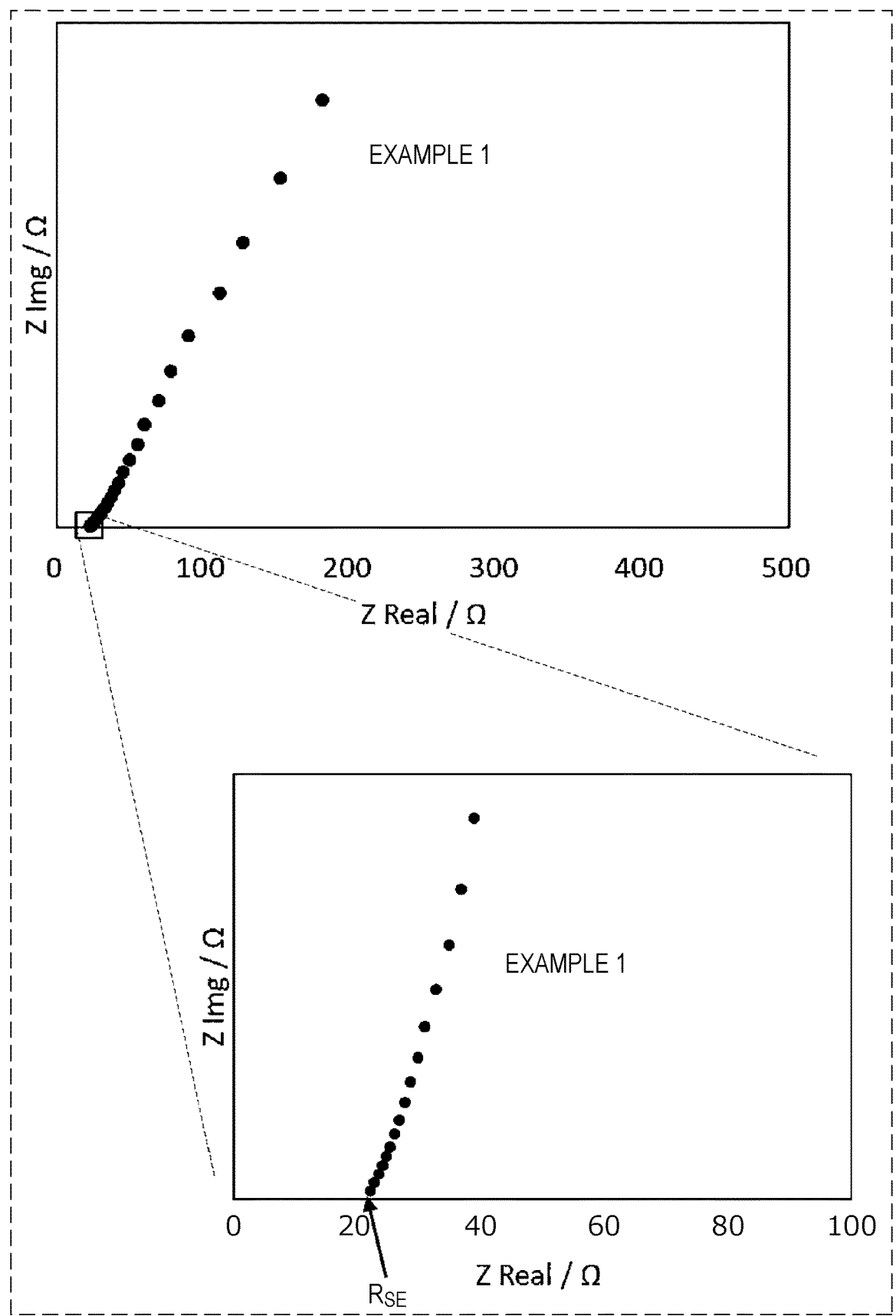
FIG. 4 is a graph showing a Cole-Cole plot obtained by impedance measurement of the solid electrolyte material of Example 1.

FIG. 4 is a graph showing a Cole-Cole plot obtained by the impedance measurement of the solid electrolyte material of Example 1.

In FIG. 4, the real value of impedance at the measurement point where the absolute value of the phase of the complex impedance was the smallest was regarded as the resistance value of the solid electrolyte material of Example 1 to ion conduction. Regarding the real value, see the arrow $R_{SE}$ shown in FIG. 4. The ion conductivity was calculated using the resistance value based on the following mathematical expression (1):

$$\sigma = (R_{SE} \times S/t)^{-1} \qquad (1).$$

Here, σ represents ion conductivity; S represents the contact area of a solid electrolyte material with the punch upper part 301 (equal to the cross-sectional area of the hollow part of the frame mold 302 in FIG. 3); $R_{SE}$ represents the resistance value of the solid electrolyte material in impedance measurement; and t represents the thickness of the solid electrolyte material applied with a pressure (equal to the thickness of the layer formed from the powder 101 of the solid electrolyte material in FIG. 3).

The ion conductivity of the solid electrolyte material of Example 1 measured at 25° C. was $3.0 \times 10^{-3}$ S/cm.

Production of Battery

The solid electrolyte material of Example 1 and $LiCoO_2$ as an active material were provided at a volume ratio of 70:30 in the dry argon atmosphere. These materials were mixed in an agate mortar. Thus, a mixture was obtained.

The solid electrolyte material (100 mg) of Example 1, the above mixture (12.0 mg), and an aluminum powder (14.7 mg) were stacked in this order in an insulating tube having an inner diameter of 9.5 mm. A pressure of 300 MPa was applied to this stack to form a first electrode and a solid electrolyte layer. The solid electrolyte layer had a thickness of about 500 μm.

Subsequently, metal In foil was stacked on the solid electrolyte layer. The solid electrolyte layer was sandwiched between the metal In foil and the first electrode. The metal In foil had a thickness of 200 μm. Subsequently, a pressure of 80 MPa was applied to the metal In foil to form a second electrode.

A current collector made of stainless steel was attached to the first electrode and the second electrode, and current collecting lead was then attached to the current collector. Finally, the inside of the insulating tube was isolated from the outside atmosphere using an insulating ferrule to seal the inside of the tube. Thus, a battery of Example 1 was obtained.

Charge and Discharge Test

Figure 5:
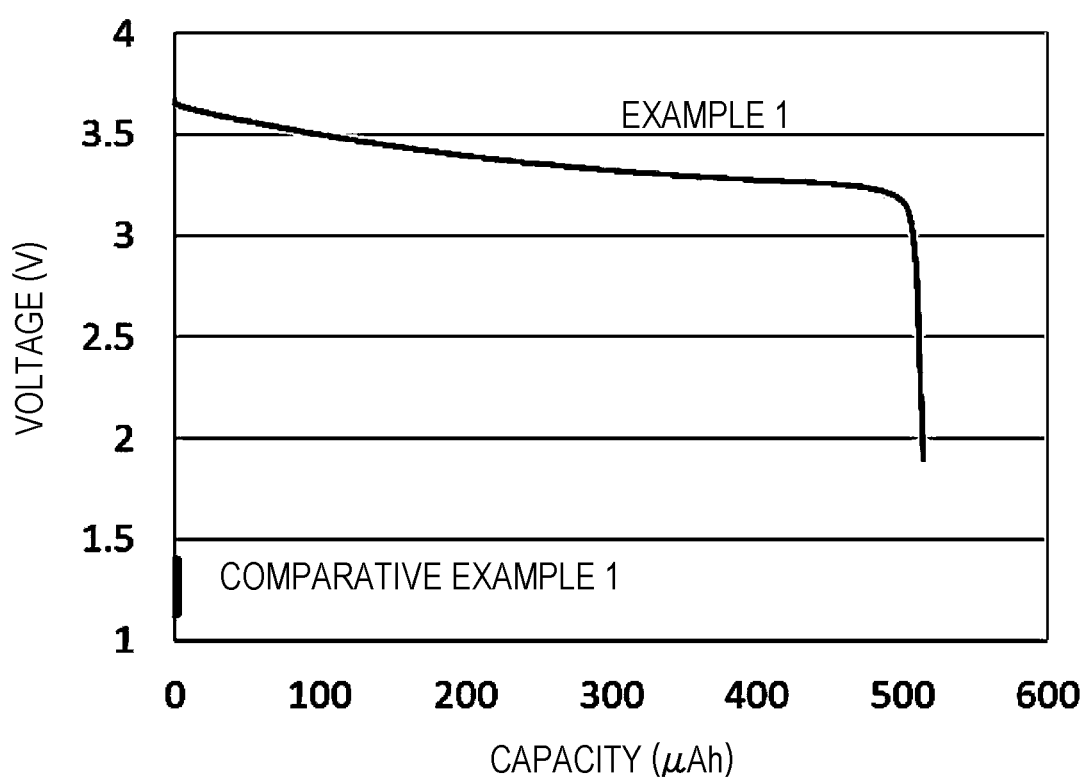
FIG. 5 is a graph showing the initial discharge characteristics of the batteries of Example 1 and Comparative Example 1.

FIG. 5 is a graph showing the initial discharge characteristics of the battery of Example 1. A charge and discharge test was performed as follows.

The battery of Example 1 was placed in a thermostatic chamber of 25° C.

The battery of Example 1 was charged with a current density of 86 µA/cm² until the voltage reached 3.7 V. The current density corresponds to 0.05 C rate.

Subsequently, the battery of Example 1 was discharged at a current density of 86 µA/cm² until the voltage reached 1.9 V.

As the results of the charge and discharge test, the battery of Example 1 had an initial discharge capacity of 515 µAh.

Examples 2 to 4

In Example 2, the solid electrolyte material of Example 1 was left to stand in a dry atmosphere having a dew point of −30° C. and an oxygen concentration of 20.9 vol % for about 30 minutes. Subsequently, the solid electrolyte material was heat-treated in the dry argon atmosphere at 500° C. for 1 hour and was then pulverized in a mortar. Thus, a solid electrolyte material of Example 2 was obtained.

In Example 3, a solid electrolyte material of Example 3 was obtained as in Example 2 except that the time during which the solid electrolyte material of Example 1 was left to stand in a dry atmosphere having a dew point of −30° C. and an oxygen concentration of 20.9 vol % was set to 2 hours instead of about 30 minutes.

In Example 4, a solid electrolyte material of Example 4 was obtained as in Example 2 except that the time during which the solid electrolyte material of Example 1 was left to stand in a dry atmosphere having a dew point of −30° C. and an oxygen concentration of 20.9 vol % was set to 80 hours instead of about 30 minutes.

The element ratio (molar ratio), X-ray diffraction, and ion conductivity of each of the solid electrolyte materials of Examples 2 to 4 were measured as in Example 1. The measurement results are shown in Tables 1 and 2. FIG. 2 is a graph showing X-ray diffraction patterns of the solid electrolyte materials of Examples 2 to 4.

The mass proportions of oxygen to the respective entire solid electrolyte materials of Examples 2 to 4 were 0.13%, 0.31%, and 1.58%.

Batteries of Examples 2 to 4 were obtained as in Example 1 using the solid electrolyte materials of Examples 2 to 4.

A charge and discharge test was implemented as in Example 1 using the batteries of Examples 2 to 4.

The batteries of Examples 2 to 4 were well charged and discharged as in the battery of Example 1.

Comparative Example 1

LiCl and $FeCl_2$ were provided as raw material powders such that the LiCl:$FeCl_2$ molar ratio was about 2:1 in the dry argon atmosphere. These materials were subjected to milling treatment using a planetary ball mill at 600 rpm for 25 hours for mechanochemical reaction. Thus, a solid electrolyte material of Comparative Example 1 was obtained. The solid electrolyte material of Comparative Example 1 was a known halide solid electrolyte material having a composition represented by $Li_2FeCl_4$.

The ion conductivity of the solid electrolyte material of Comparative Example 1 was measured as in Example 1. As a result, the ion conductivity measured at 22° C. was $9.0 \times 10^{-6}$ S/cm.

A battery of Comparative Example 1 was obtained as in Example 1 using the solid electrolyte material of Comparative Example 1.

A charge and discharge test was implemented as in Example 1 using the battery of Comparative Example 1. The battery of Comparative Example 1 had an initial discharge capacity of only 1 µAh or less. That is, the battery of Comparative Example 1 was neither charged nor discharged.

TABLE 1

| | Element ratio (molar ratio) | | | | | | | Ion conductivity |
|---|---|---|---|---|---|---|---|---|
| | Li | Ca | Y | Sm | Br | Cl | O | (S/cm) |
| Example 1 | 3.07 | 0.10 | 0.80 | 0.20 | 1.80 | 3.75 | 0.01 | $3.0 \times 10^{-3}$ |
| Example 2 | 3.10 | 0.10 | 0.80 | 0.20 | 1.88 | 3.94 | 0.04 | $2.7 \times 10^{-3}$ |
| Example 3 | 2.99 | 0.10 | 0.80 | 0.20 | 1.68 | 3.59 | 0.08 | $1.2 \times 10^{-3}$ |
| Example 4 | 3.03 | 0.10 | 0.80 | 0.20 | 1.37 | 3.02 | 0.36 | $4.4 \times 10^{-5}$ |
| Comparative Example 1 | | | | $Li_2FeCl_4$ | | | | $9.0 \times 10^{-6}$ |

TABLE 2

| | X-ray diffraction peak position (2θ (deg)) | | | | | | | | | | |
|---|---|---|---|---|---|---|---|---|---|---|---|
| Example 1 | — | 15.43 | 16.80 | 22.90 | 28.67 | 30.59 | 32.76 | 39.80 | 47.55 | 52.05 | — | — |
| Example 2 | 14.26 | 15.43 | 16.81 | 22.91 | 28.70 | 30.56 | 32.72 | 39.74 | 47.54 | 52.02 | — | 59.36 |
| Example 3 | — | 15.43 | 16.77 | 22.87 | 28.66 | 30.55 | 32.68 | 39.70 | 47.54 | 52.02 | 57.58 | — |
| Example 4 | 14.29 | 15.44 | 16.80 | 22.90 | 28.70 | 30.56 | 32.68 | 39.72 | 47.54 | 52.01 | 57.59 | 59.36 |

Consideration

As obvious from Table 1, the solid electrolyte materials of Examples 1 to 4 each have a high ion conductivity of $1 \times 10^{-5}$ S/cm or more at around room temperature.

As obvious from Examples 1 to 4, when the molar ratio of O to the sum of Y and Sm is greater than 0 and 0.36 or less, the solid electrolyte material has a high ion conductivity of $1 \times 10^{-5}$ S/cm or more. As obvious by comparing Examples 1 to 3 with Example 4, when the molar ratio is greater than 0 and 0.08 or less, the solid electrolyte material has a higher ion conductivity of $1 \times 10^{-3}$ S/cm or more.

As obvious from the X-ray diffraction patterns shown in FIG. 2 and from Table 2, the crystal structure of a solid electrolyte material changes depending on the content of O. The contents of Br and Cl decrease with an increase in the content of O. Accordingly, it is inferred that O was substituted with Br and Cl and was incorporated into the crystal structure.

The batteries of Examples 1 to 4 were charged and discharged at 25° C.

Since the solid electrolyte materials of Examples 1 to 4 do not contain sulfur, hydrogen sulfide does not occur.

As described above, the solid electrolyte material of the present disclosure has a high lithium ion conductivity and is suitable for providing a battery that can be well charged and discharged.

The solid electrolyte material of the present disclosure is used in, for example, an all solid lithium ion secondary battery.

What is claimed is:

1. A solid electrolyte material consisting essentially of Li, Ca, Y, Sm, X, and O, and
optionally at least one selected from the group consisting of Gd, Sr, Ba, Al, Sc, Ga, Bi, La, Zr, Hf, Ta, and Nb, wherein
X is at least one selected from the group consisting of F, Cl, Br, and I; and
the following four mathematical expressions are satisfied:

$2.6 \leq x \leq 3.4$, $0.09 \leq y \leq 0.11$, $1.2 \leq z \leq 2.1$, and $2.7 \leq w \leq 4.4$, where
x represents a molar ratio of Li to the sum of Y and Sm,
y represents a molar ratio of Ca to the sum of Y and Sm,
z represents a molar ratio of Br to the sum of Y and Sm, and
w represents a molar ratio of Cl to the sum of Y and Sm.

2. The solid electrolyte material according to claim 1, wherein
X is Cl and Br.

3. The solid electrolyte material according to claim 1, wherein the solid electrolyte material is formed of the Li, Ca, Y, Sm, X, and O, and the at least one selected from the group consisting of Gd, Sr, Ba, Al, Sc, Ga, Bi, La, Zr, Hf, Ta, and Nb.

4. The solid electrolyte material according to claim 1, wherein
an X-ray diffraction pattern obtained by X-ray diffraction measurement using Cu-Kα rays includes peaks in diffraction angle 2θ ranges of 14.9° or more and 16.0° or less, 16.2° or more and 17.4° or less, 22.3° or more and 23.5° or less, 28.1° or more and 29.2° or less, 30.0° or more and 31.2° or less, 32.1° or more and 33.3° or less, 39.2° or more and 40.3° or less, 47.0° or more and 48.1° or less, and 51.5° or more and 52.6° or less.

5. The solid electrolyte material according to claim 1, wherein
a molar ratio of O to the sum of Y and Sm is greater than 0 and 0.36 or less.

6. A battery comprising:
a positive electrode;
a negative electrode; and
an electrolyte layer disposed between the positive electrode and the negative electrode, wherein
at least one selected from the group consisting of the positive electrode, the negative electrode, and the electrolyte layer contains the solid electrolyte material according to claim 1.

* * * * *